(12) United States Patent
Bakulin et al.

(10) Patent No.: US 11,880,010 B2
(45) Date of Patent: Jan. 23, 2024

(54) PROVIDING SEISMIC IMAGES OF THE SUBSURFACE USING ENHANCEMENT OF PRE-STACK SEISMIC DATA

(71) Applicants: Saudi Arabian Oil Company, Dhahran (SA); Trofimuk Institute of Petroleum Geology and Geophysics, Novosibirsk (RU)

(72) Inventors: Andrey Bakulin, Dhahran (SA); Dmitry Neklyudov, Novosibirsk (RU); Maxim Dmitriev, Dhahran (SA); Ilya Silvestrov, Dhahran (SA)

(73) Assignees: Saudi Arabian Oil Company, Dhahran (SA); Trofimuk Institute of Petroleum Geology and Geophysics, Novosibirsk (RU)

( * ) Notice: Subject to any disclaimer, the term of this patent is extended or adjusted under 35 U.S.C. 154(b) by 144 days.

(21) Appl. No.: 17/595,376

(22) PCT Filed: May 13, 2019

(86) PCT No.: PCT/RU2019/000330
§ 371 (c)(1),
(2) Date: Nov. 15, 2021

(87) PCT Pub. No.: WO2020/231287
PCT Pub. Date: Nov. 19, 2020

(65) Prior Publication Data
US 2022/0196866 A1     Jun. 23, 2022

(51) Int. Cl.
*G01V 1/36* (2006.01)
(52) U.S. Cl.
CPC ........ *G01V 1/362* (2013.01); *G01V 2210/322* (2013.01); *G01V 2210/52* (2013.01)

(58) Field of Classification Search
None
See application file for complete search history.

(56) References Cited

U.S. PATENT DOCUMENTS 3,398,396 A   8/1968 Embree
3,597,727 A   8/1971 Judson et al.
(Continued)

FOREIGN PATENT DOCUMENTS

WO   2016118393   7/2016
WO   2017035104   3/2017

OTHER PUBLICATIONS

Bakulin, Andrey, et al. "Efficient prestack enhancement based on local stacking: Finding optimal domain for modern 3D land seismic data." 2018 SEG International Exposition and Annual Meeting. OnePetro (Year: 2018).*

(Continued)

*Primary Examiner* — Lina Cordero
(74) *Attorney, Agent, or Firm* — Fish & Richardson P.C.

(57) ABSTRACT

A system provides seismic images of the subsurface by enhancing pre-stack seismic data. The system obtains seismic data comprising a plurality of seismic traces that are generated by measuring reflections of seismic waves emitted into a geological formation. The system sorts seismic data into at least one multidimensional gather comprising a data domain. The system determines local kinematical attributes of a seismic trace. The system forms an ensemble of seismic traces, each representing a reference point. The system applies local moveout corrections to each seismic trace of the ensemble. The system applies residual statics and phase corrections for each seismic trace that is corrected by the local moveout corrections. The system sums the seismic traces of the ensemble to obtain an output seismic trace having an increased signal-to-noise ratio (SNR) relative to (Continued)

the seismic trace that represents the reference point for the ensemble of seismic traces.

20 Claims, 13 Drawing Sheets

(56) References Cited

U.S. PATENT DOCUMENTS

| | | | |
|---|---|---|---|
| 4,706,224 | A | 11/1987 | Alford |
| 4,970,697 | A | 11/1990 | Earley et al. |
| 5,544,126 | A | 8/1996 | Berryhill |
| 5,572,483 | A | 11/1996 | Chambers et al. |
| 5,930,730 | A | 7/1999 | Marfurt et al. |
| 5,971,095 | A | 10/1999 | Ozbek |
| 6,065,538 | A | 5/2000 | Reimers et al. |
| 6,088,299 | A | 7/2000 | Erath et al. |
| 6,374,185 | B1 | 4/2002 | Taner et al. |
| 6,493,634 | B1 | 12/2002 | Krebs et al. |
| 6,535,818 | B1 | 3/2003 | Baeten |
| 6,728,165 | B1 | 4/2004 | Roscigno et al. |
| 6,754,591 | B1 | 6/2004 | Herkenhoff et al. |
| 7,746,726 | B2 | 6/2010 | Fuller et al. |
| 8,082,107 | B2 | 12/2011 | Higginbotham et al. |
| 2012/0092960 | A1 | 4/2012 | Gaston et al. |
| 2013/0265851 | A1 | 10/2013 | Faber et al. |
| 2014/0036628 | A1 | 2/2014 | Hill et al. |
| 2016/0291177 | A1 | 10/2016 | Albertin et al. |
| 2018/0031723 | A1 | 1/2018 | Rai et al. |
| 2018/0347347 | A1 | 12/2018 | Bakulin |
| 2020/0400847 | A1 | 12/2020 | Bakulin et al. |

OTHER PUBLICATIONS

Andrey Bakulin, Ilya Silvestrov, Maxim Dmitriev, Pavel Golikov, Dmitry Neklyudov, Maxim Protasov, Kirill Gadylshin, Vladimir Tcheverda, and Victor Dolgov, "Nonlinear beamforming for enhancing pre-stack data with challenging near surface or overburden," SEG Technical Program Expanded Abstracts (Year: 2018).*

Al-Ali and Verschuur, "An integrated method for resolving the seismic complex near surface problem," Section I—Madrid Workshop on Near-Surface 2005, Geophysical Prospecting, vol. 54, No. 6, Nov. 2, 2006, 12 pages.

Asakawa et al., "Development of vertical cable seismic system," P008, presented at the 74th Conference and Exhibition, SPE EuropeC, Jun. 4-7, 2012, 5 pages.

Bagaini, "Performance of Time-Delay Estimators" Geophysics vol. 70, No. 4, Jul.-Aug. 2005, V109-V120, 12 pages.

Bakulin and Jervis, "Permanent seismic installation with buried receivers for seismic monitoring of CO2 injection in desert environment: Lessons learned," presented at SEG/SPE Joint Workshop, Reservoir engineering and geophysical monitoring technology of EOR applications, May 7-15, 2017, 1 page.

Bakulin et al., "Application of Supergrouping to Enhance 3D Prestack Seismic Data from a Desert Enviorment" The Leading Edge, Mar. 2018, 8 pages.

Bakulin et al., "Application of supergrouping to land seismic data in desert environement," SEG International Exposition and 86th Annual Meeting, 2016, 5 pages.

Bakulin et al., "Bring geophysics closer to the reservoir—a new paradigm in reservoir characterization and monitoring," presented at the 85th Annual International Meeting, SEG, Expanded Abstracts, Oct. 18-23, 2015, 5 pages.

Bakulin et al., "Efficient prestack enhancement based on local stacking: finding optimal domain for modern 3D land-seismic data" SEG Technical Program Expanded Abstracts, Aug. 2018, 5 pages.

Bakulin et al., "Evaluating permanent seismic monitoring with shallow buried sensors in a desert environment," 82nd Annual International Meeting, Expanded Abstracts, Nov. 4-9, 2012, 5 pages.

Bakulin et al., "Making seismic monitoring work in a desert environment with complex near surface," 83rd Annual International Meeting, SEG Expanded Abstracts, Sep. 22-27, 2013, 5 pages.

Bakulin et al., "Nonlinear Beamforming for Enhancing Prestack Seismic Data With a Challenging Near Surface or Overburden" Data Processing & Machine Learning, Dec. 2018, 5 pages.

Bakulin et al., "Smart DAS upholes for simultaneous land near-surface characterization and subsurface imaging," Special Section: Fiber-optic distributed sensing, The Leading Edge, Dec. 2017, 8 pages.

Baykulov and Gajewski, "Prestack seismic data enhancement with partial common-reflection-surface (CRS) stack," Geophysics vol. 74, No. 3, May-Jun. 2009, 10 pages.

Berkovitch et al., "How Non-Hyperbolic Multifocusing Improves Depth Imaging" First Break vol. 29, Sep. 2011, 103-111, 9 pages.

Berkovitch et al., "Multifocusing as a Method of Improving Subsurface Imaging" The Leading Edge, Feb. 2008, 250-256, 6 pages.

Bishop et al., "Tomographic determination of velocity and depth in laterally varying media," Geophysics vol. 50, No. 6, Jun. 1985, 22 pages.

Bridle et al., "Near-surface models in Saudi Arabia," Geophysical Prospecting, vol. 55, Issue 6, Nov. 2007, 14 pages.

Buzlukov et al., "C011: Prestack Data Enhancement Using Local Traveltime Approximation," presented at the 72nd EAGE Conference and Exhibition incorporating SPE EuropeC, Jun. 14-17, 2010, 5 pages.

Buzlukov et al., "Imaging Improvement by Prestack Signal Enhancement" European Association of Geoscientists & Engineers, Geophysical Prospecting, 61, Nov. 2013, 1150-1158, 9 pages.

Cox, "Chapter 4—Uphole Surveys," Static corrections for seismic reflection surveys, Society of Exploration Geophysics, Jan. 1, 1999, 38 pages.

Curia et al., "The Impact of Multifocusing in the Processing of Land 3D Seismic Data in a Fold and Thrust Belt Setting: Ranquil Norte Block, Neuquen Basin, Argentina" The Leading Edge, Sep. 2017, 5 pages.

Durveneck, "Tomographic velocity model estimation with data-derived first and second travel time derivatives," SBGf, presentated at the 8th International Congress of the Brazilian Geophysical Society, Brazil, Sep. 14-18, 2003, 4 pages.

Duveneck, "Tomographic determination of seismic velocity models with kinematic wavefield attributes," Zur Erlangung des akademischen Grades eines, Doktors De Naturwissenschaften von der Fakultat fur Physik der Universitat Karlsruhe (TH) genehmigte, Dissertation von Dipl.-Geophys. Eric Duveneck aus Bremen, Logos Verlag, English Abstract, Jun. 25, 2004, 203 pages.

Duveneck, "Velocity model estimation with data-derived wavefront attributes," Geophysics vol. 69, Issue 1, Jan. 2004, 10 pages.

Fagin, "Model based depth imaging," Society of Exploration Geophysics, Course Notes Series No. 10, Tulsa, USA, 1999, 184 pages.

Gjoystdal and Ursin, "Inversion of reflection times in three dimensions," Geophysics vol. 46, No. 7, Jul. 1981, 12 pages.

Gulati et al., "Vertical hydrophone cable acquisition and imaging on land," Geophysics vol. 66, No. 4, Jul.-Aug. 2001, 5 pages.

Hoecht et al., "Operator-oriented CRS interpolation," Geophysical Prospecting, vol. 57, Issue 6, Nov. 2009, 23 pages.

Hubral and Krey, "Interval Velocities from Seismic Reflection Time Measurements," Society of Exploration Geophysicists, 1980, 214 pages.

Ikelle and Wilson, "Potential impacts of vertical cable (VC)," Acquisition Processing, The Leading Edge, Oct. 1999, 3 pages.

Jones, "Estimating subsurface parameter fields for seismic migration: Velocity model building," Seismic velocity/statics, Oct. 2015, 24 pages.

Khaidukov et al., "Enhacement of seismic data gathered by floating ice acquisition: application of local kinematic attributes," SEG International Exposition and 86th Annual Meeting, 2016, 5 pages.

Klüver, "Velocity model building using migration to residual time," SEG Technical Program Expanded Abstracts, SEG/New Orleans 2006 Annual Meeting, 5 pages.

Koglin et al., "Section I—Madrid Workshop on Near-Surface 2005, CRS-stack-based residual static correction," Geophysical Prospecting vol. 54, Issue 6, Nov. 2006, 11 pages.

(56) References Cited

OTHER PUBLICATIONS

Lambaré et al., "Multi-layer non-linear slope tomography," 75th Annual International Conference and Exhibition, EAGE, Extended Abstracts, London, Jun. 10-13, 2013, 5 pages.

Lambaré, "Stereotomography," Geophysics, vol. 73, No. 5, VE25-VE34, Sep. 2008, 10 pages.

Lavaud et al., "Automatic robust velocity estimation by poststack stereotomography," SEG Technical Program Expanded Abstracts 2004, SEG International Exposition and 74th Annual Meeting, Oct. 10-15, 2004, 4 pages.

Ley et al., "Development of near surface models in Saudi Arabia for low relief structures and complex near surface geology," SEG Technical Program Expanded Abstracts, SEG Annual Meeting, Oct. 26-31, 2003, 4 pages.

Mao et al., "Simultaneous determination of time delays and stacking weights in seismic array beamforming." Geophysics 60.2, Mar. 1995, 491-502, 12 pages.

Mateeva et al., "Distributed acoustic sensing for reservoir monitoring with VSP," Special Section: 3D Vsp, The Leading Edge, Oct. 2013, 5 pages.

Miller et al., "Vertical seismic profiling using a fibre-optic cable as a distributed acoustic sensor," Y004, presented at the 74th Conference and Exhibition, SPE EuropeC, Jun. 4-7, 2012, 5 pages.

Mueller et al., "Improving Prestack Migration with CRS" 72nd Eage Conference & Exhibition incorporating SPE EuropeC 2010, D032, Barcelona, Spain, Jun. 14-17, 2010, 5 pages.

Neckludov et al., "Residual stereotomographic inversion," Geophysics, 71, No. 4, E35-E39, Jul. 2006, 6 pages.

Neklyudov et al., "Intraarray statics and phase corrections obtained by beamforming in the short-time Fourier transform domain: Application to supergrouping." 2017 SEG International Exposition and Annual Meeting, Sep. 2017, 5 pages.

Nosjean et al., "Statics: from imaging to interpretation pitfalls and an efficient way to overcome them," First Break, vol. 35, No. 1, Jan. 2017, 8 pages.

Oristaglio, "SEAM update: The Arid model—seismic exploration in desert terrains," The Leading Edge, vol. 34, No. 4, Apr. 2015, 2 pages.

PCT International Search Report and Written Opinion in International Appln. No. PCT/US2019/000330, dated Jan. 30, 2020, 17 pages.

Ronen et al., "Surface-consistent residual statics estimation by stack-power maximization." Geophysics 50.12, Dec. 1985, 2759-2767, 9 pages.

Schuster, "Seismic interferometry," Cambridge University Press, Jan. 2, 2009, 279 pages.

Silverstrov et al., "Waveform inversion of surface waves in f-k domain in locally 1D formulations," 85th Annual International Meeting, SEG, Expanded Abstracts, Oct. 18-23, 2015, 6 pages.

Taner et al., "Estimation of unbiased delays" Geophysics 63.2, Mar. 1998, 738-742, 5 pages.

Tanushev et al., "Fast, high-resolution beam tomography and velocity-model building," the Leading Edge, vol. 36, Issue 2, Feb. 2017, 6 pages.

Van Der Made et al., "Estimation of complex velocity models from stacking information," SEG Technical program Expanded Abstracts, 1987, 3 pages.

Woodward et al., "A decade of tomography," Geophysics, vol. 73, No. 5, Sep.-Oct. 2008, 7 pages.

Zhang et al., "common-reflection-surface (CRS) stack for common offset," Geophysical Prospecting, vol. 49, No. 6, Nov. 2001, 10 pages.

EPO Communication Pursuant to Article 94(3) EPC in European Appln. 19736833.5, dated Feb. 7, 2023, 19 pages.

* cited by examiner

PROVIDING SEISMIC IMAGES OF THE SUBSURFACE USING ENHANCEMENT OF PRE-STACK SEISMIC DATA

CROSS-REFERENCE TO RELATED APPLICATION(S)

This application is a U.S. National Phase Application under 35 U.S.C. § 371 and claims the benefit of priority to International Application Serial No. PCT/RU2019/000330, filed May 13, 2019, the contents of which are hereby incorporated by reference.

TECHNICAL FIELD

This disclosure relates to methods, systems, and apparatus for providing seismic images of the subsurface, and in particular, using enhancement of pre-stack seismic data for providing seismic images.

BACKGROUND

Hydrocarbons, such as oil and gas, occur in the Earth's subsurface at a depth ranging from a few hundred meters to several kilometers and are found in geological formations, which are layers of rock. As such, prospecting for hydrocarbons includes the difficult tasks of identification of where such geological formations exist and extraction of the hydrocarbons from these geological formations at such depths. Identifying the location of hydrocarbons may include the conducting of geological surveys collected through, for example, seismic prospecting. These geological surveys can be employed to construct geological maps representing the structure of areas of the outer crust of the Earth.

SUMMARY

This specification describes systems and methods for providing seismic images of the subsurface using enhancement of pre-stack seismic data. These systems and methods preserve, in the seismic data, valuable local information in the pre-stack seismic data such as residual statics, wavelet shape, and frequency band. While the preserved information is encoded in the original data, the preserved information generally cannot be extracted from the pre-stack seismic data because of low signal-to-noise ratio (SNR). While enhancement methods based on local summation increase SNR, these methods inevitably smear out and average local information. This process for enhancement of pre-stack seismic data alleviates these shortcomings by using of efficient data-driven estimation of local travel-time signal trajectories directly from the data (for example, for each time sample and each spatial location of the seismic data) and by application of general waveform correction that compensates for differences in travel-times, phase and amplitude. The process can allow for significant advances in processing results of modern high-channel count and signal-sensor data and enables extracting more usable information from the modern land data surveys.

The processes described in this disclosure include several advantages. The systems and processes for enhancing of pre-stack seismic data compensate and preserve local travel-time shifts and waveform variations in the enhanced data. This information is of great importance for estimating of reliable processing parameters such as residual statics corrections, deconvolution operators, stacking velocities and amplitude scalars. The reliable estimation of such parameters and their usage is an essential step of an "enhance, estimate, image" approach generally performed for processing of modern dense land seismic data in order to get better seismic images of the subsurface. These methods for enhancing pre-stack seismic data can lead to significant advances in processing results of modern high-channel count and signal-sensor data and should enable extracting more usable information from the current and future land data surveys.

The deficiencies of most of the prior art methods for pre-stack data enhancement include smearing out and averaging of local information about residual statics, wavelet shape and frequency band. Prior methods that try to preserve such information do not allow enhancement of noisy data in a data-driven way because no information about local coherent events is used. Noisy data can include data in which a signal is not distinguishable from noise during a single measurement of the data without additional information about the signal. For example, noisy data includes a signal to noise ratio (SNR) below a threshold value.

The processes for enhancing pre-stack seismic data overcome most of the drawbacks of the prior art methods and can be used to enhance noisy data while preserving local information about residual statics, wavelet shape and frequency band. This cannot be achieved by a simple combination of the prior art methods.

These processes are expected to provide significant advances in processing results of modern high-channel count and signal-sensor data and should enable extracting more usable information from the modern land data surveys.

In an aspect, the systems and methods are configured to perform a process for providing seismic images of the subsurface by enhancing pre-stack seismic data. The actions include obtaining, by one or more processors, seismic data including a plurality of seismic traces that are generated by measuring reflections of seismic waves emitted into a geological formation. The actions include sorting, by the one or more processors, the seismic data into at least one multidimensional gather including a data domain. The actions include determining, by the one or more processors, local kinematical attributes of a seismic trace of the plurality of seismic traces. The local kinematical attributes represent travel-times local to the seismic trace. The actions include forming, by the one or more processors, an ensemble of seismic traces. The seismic trace represents a reference point for the ensemble. The actions include applying, by the one or more processors, local moveout corrections to each seismic trace of the ensemble. The actions include applying, by the one or more processors, residual statics and phase corrections for each seismic trace that is corrected by the local moveout corrections. The actions include summing, by the one or more processors, the seismic traces of the ensemble to obtain an output seismic trace having an increased signal-to-noise ratio (SNR) relative to the seismic trace of the plurality of seismic traces that represents the reference point for the ensemble of seismic traces.

In some implementations, the seismic trace that represents the reference point for the ensemble of seismic traces comprises a parametric trace including a plurality of kinematical parameters for each time sample of the seismic traces of the plurality.

In some implementations, the data domain comprises one of a cross-spread domain, a common-shot domain, a common-offset domain, or a common receiver domain.

In some implementations, summing the seismic traces of the ensemble includes a summation aperture of 250 meters (m) by 250 meters in a common-midpoint gather direction and an offset direction.

In some implementations, sorting the seismic data into the multidimensional gather including the data domain comprises selecting the data domain based on at least one of azimuth preservation, a number of the seismic traces in the plurality of seismic traces, a density of a distribution of the plurality of seismic traces, a regularity of the distribution of the plurality of the seismic traces, and a reflection travel-time of the plurality of the seismic traces in the data domain.

In some implementations, determining the local kinematical attributes for the seismic trace includes searching for optimal values of the local kinematical attributes in a multi-dimensional coherency panel.

In some implementations, the actions include performing a time imaging or a depth imaging representation of the geological formation based on the output seismic trace. The actions further include providing a graphical representation of the time imaging or the depth imaging representation of the geological formation by a user interface.

In another aspect, a system including a computer memory and at least one computer processor interoperably coupled with the computer memory is configured to perform operations including obtaining, by the at least one computer processor, seismic data including a plurality of seismic traces that are generated by measuring reflections of seismic waves emitted into a geological formation. The operations include sorting, by the at least one computer processor, the seismic data into at least one multidimensional gather including a data domain. The operations include determining, by at least one computer processor, local kinematical attributes of a seismic trace of the plurality of seismic traces. The local kinematical attributes represent travel-times local to the seismic trace. The operations include forming, by the at least one computer processor, an ensemble of seismic traces. The seismic trace represents a reference point for the ensemble. The operations include applying, by the at least one computer processor, local moveout corrections to each seismic trace of the ensemble. The operations include applying, by the at least one computer processor, residual statics and phase corrections for each seismic trace that is corrected by the local moveout corrections. The operations include summing, by the at least one computer processor, the seismic traces of the ensemble to obtain an output seismic trace having an increased signal-to-noise ratio (SNR) relative to the seismic trace of the plurality of seismic traces that represents the reference point for the ensemble of seismic traces.

In an aspect, a non-transitory, computer-readable medium stores one or more instructions executable by a computer system, and the instructions are configured to cause the computer system to perform operations including obtaining, by at least one computer processor of the computer system, seismic data including a plurality of seismic traces that are generated by measuring reflections of seismic waves emitted into a geological formation. The operations include sorting, by the at least one computer processor, the seismic data into at least one multidimensional gather including a data domain. The operations include determining, by at least one computer processor, local kinematical attributes of a seismic trace of the plurality of seismic traces. The local kinematical attributes represent travel-times local to the seismic trace. The operations include forming, by the at least one computer processor, an ensemble of seismic traces. The seismic trace represents a reference point for the ensemble. The operations include applying, by the at least one computer processor, local moveout corrections to each seismic trace of the ensemble. The operations include applying, by the at least one computer processor, residual statics and phase corrections for each seismic trace that is corrected by the local moveout corrections. The operations include summing, by the at least one computer processor, the seismic traces of the ensemble to obtain an output seismic trace having an increased signal-to-noise ratio (SNR) relative to the seismic trace of the plurality of seismic traces that represents the reference point for the ensemble of seismic traces.

It is appreciated that methods in accordance with the present disclosure can include any combination of the aspects and features described in this disclosure. That is, methods in accordance with the present disclosure are not limited to the combinations of aspects and features specifically described in this disclosure, but also may include any combination of the aspects and features provided.

The details of one or more implementations of the present disclosure are set forth in the accompanying drawings and the description included in this disclosure. Other features and advantages of the present disclosure will be apparent from the description and drawings, and from the claims.

DETAILED DESCRIPTION

Figure 1:
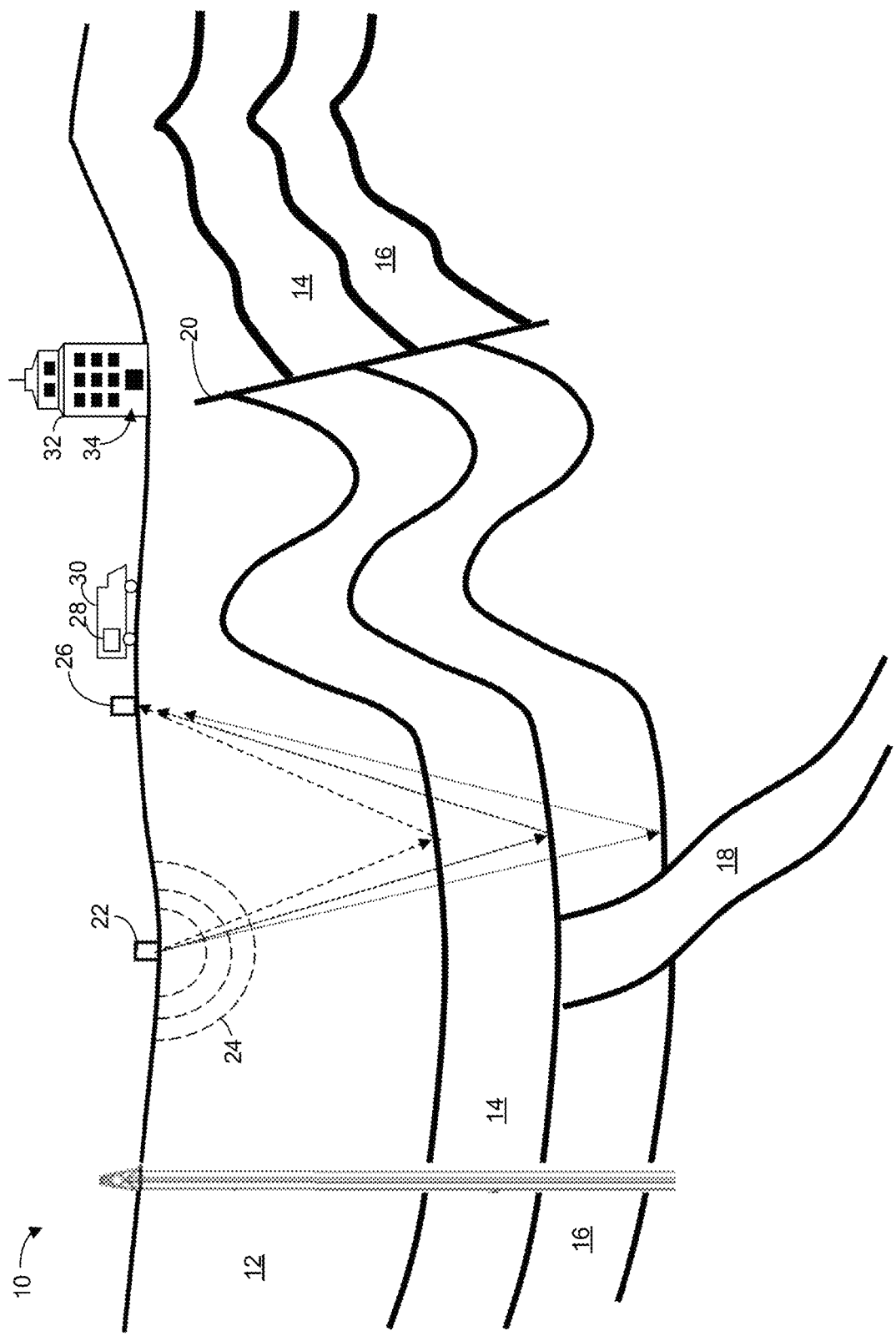
FIG. 1 is a schematic view of a seismic survey being performed to map subterranean features such as facies and faults.

This disclosure generally describes a process for enhancing seismic data to enable further extraction of information from the seismic data that is otherwise lost. The disclosure is presented to enable any person skilled in the art to make and use the disclosed subject matter in the context of one or more particular implementations. Various modifications to the disclosed implementations will be readily apparent to those skilled in the art, and the general principles defined in this application may be applied to other implementations and applications without departing from scope of the disclosure. Thus, the present disclosure is not intended to be limited to the described or illustrated implementations, but is to be accorded the widest scope consistent with the principles and features disclosed in this application.

To extract the contained hydrocarbons, a respective geological formation has to have sufficient porosity and permeability to be productive. Porosity includes the fraction of the bulk volume of rock that is not rock (for example, the spaces in between grains). Porosity may range from a few percent to more than 30 percent. Hydrocarbon formations may also contain water in the pore spaces, which may or may not flow along with the hydrocarbon. Permeability includes a measure of how easily fluids flow through a porous rock, which may vary dramatically by layer. Geological models, for example, can be employed to capture the spatial variability in porosity, permeability, and water and hydrocarbon saturations.

Moreover, geological layers and formations may exhibit even more complexity in the subsurface than they do at the surface. These formation may include, for example, meandering river channels and streams, carbonate reefs, beaches, dunes and the jumbled mix of sands and shales that characterize turbidities. Additionally, complex faults, salt domes and other features further complicate the subterranean environment.

Seismic surveys, well logs, cores, and so forth may be employed to generate three-dimensional (3D) models that map subsurface formations. Data can be captured using small field arrays configured to capture reflections of signals emitted into the subsurface formation. For example, a geo-cellular model may use grids to construct a static model of a reservoir. These grids may include information regarding the petrophysical, geological, geophysical, fluid, and rock depicted as spatially distributed throughout the respective reservoir. For example, a geo-cellular model may include a vertical cell size of one to two feet. Such a model can be constructed by kriging the well logs into the space using a deterministic or a stochastic approach.

Modern dense land seismic datasets acquired with small field arrays often have poor signal-to-noise ratio due to complex near-surface conditions. Every processing step for generating the 3D models that relies on pre-stack data is challenging in such a case because reflected signals are weak, irregular, and are hidden behind strong coherent and random noise. Conventional time processing tools such as surface-consistent scaling, statics correction, deconvolution and velocity analysis require reliable pre-stack signal in the data. Their application to the modern datasets often leads to unreliable results because the derived operators (processing parameters) are based on noise and not on signal. To extract maximum valuable information from the dense high-channel acquisitions, the model generator should suppress noise and enhance the signal in the pre-stack data.

Different methods have been proposed to enhance pre-stack seismic data. Multi-dimensional data-driven stacking techniques such as common-reflection surface method (CRS) or multi-focusing (MF) are used to get better stack sections and to enhance pre-stack gathers. However, these methods assume a global trajectory of the reflection events, which may fail in complex geological conditions. Non-zero offset CRS and non-hyperbolic MF methods are proposed to avoid global hyperbolic approximations and to use local kinematic wave-field parameters. A similar approach describes enhancing pre-stack data in the common-offset domain based on searching for locally coherent events in the data and then partial summing along the estimated trajectories. Unlike CRS or MF techniques, this method uses a general second-order approximation of travel-time surfaces without using an identification of model-based parameters. Such multidimensional data stacking can be considered as a delay-and-sum beamforming method. This methodology has been adopted for a two-dimensional (2D) case, and examples of application of the non-linear beamforming are shown to enhance data in common-midpoint-offset domain. For example, a nonlinear beamforming method for enhancement of land pre-stack data in the cross-spread domain has been proposed.

One common feature of all the previously outlined approaches is a local stacking of coherent signals contained in the neighboring traces. To get the reliable pre-stack signal in case of noisy data, such kind of approaches often require large stacking apertures that can reach hundreds of meters, which can be impractical to implement. This is because individual traces from such large stacking ensemble can be recorded in different near-surface conditions. As a result, these traces often have different local time-shifts and variations of the waveforms. As a consequence, enhanced data obtained after such stacking along the estimated average local travel-time surfaces may suffer from suboptimal stacking. This results in a suppression of high frequencies of the desired signals and in smearing of valuable information about residual statics and deconvolution operators within the stacking aperture In view of the forgoing, the described process includes a methodology to improve reliability in generated geo-cellular models by enhancing the pre-stack seismic data using data driven local summation with waveform corrections. More specifically, this process uses efficient data-driven estimation of local travel-time signal trajectories directly from the data (for each time sample and each spatial location) and application of general waveform correction that compensates for differences in travel-times, phase and amplitude to preserve valuable local information such as residual statics, wavelet shape and frequency band.

The proposed process is expected to provide significant advances in processing results of modern high-channel count and signal-sensor data and should enable extracting more usable information from the modern land data surveys.

FIG. 1 is a schematic view of a seismic survey being performed to map subterranean features such as facies and faults in a subterranean formation 10. The process of pre-stack data enhancement can be used to better perform seismic surveys by providing more refined data (for example, data including extractable residual statics, wavelet shape and frequency band) describing the subterranean features given the data received. The subterranean formation 10 includes a layer of impermeable cap rocks 12 at the surface. Facies underlying the impermeable cap rocks 12 include a sandstone layer 14, a limestone layer 16, and a sand layer 18. A fault line 20 extends across the sandstone layer 14 and the limestone layer 16.

A seismic source 22 (for example, a seismic vibrator or an explosion) generates seismic waves 24 that propagate in the earth. The velocity of these seismic waves depends on properties such as, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 10, the velocity of seismic waves traveling through the subterranean formation 10 will be different in the sandstone layer 14, the limestone layer 16, and the sand layer 18. As the seismic waves 24 contact interfaces between geologic bodies or layers that have different velocities, the interface reflects some of the energy of the seismic wave and refracts part of the energy of the seismic wave. Such interfaces are sometimes referred to as horizons.

The seismic waves 24 are received by a sensor or sensors 26. Although illustrated as a single component in FIG. 1, the sensor or sensors 26 are typically a line or an array of sensors 26 that generate an output signal in response to received seismic waves including waves reflected by the horizons in the subterranean formation 10. The sensors 26 can be geophone-receivers that produce electrical output signals transmitted as input data, for example, to a computer 28 on a seismic control truck 30. Based on the input data, the computer 28 may generate a seismic data output such as, for example, a seismic two-way response time plot.

A control center 32 can be operatively coupled to the seismic control truck 30 and other data acquisition and wellsite systems. The control center 32 may have computer facilities for at least one of receiving, storing, processing, and analyzing data from the seismic control truck 30 and other data acquisition and wellsite systems. For example, computer systems 34 in the control center 32 can be configured to analyze, model, control, optimize, or perform management tasks of field operations associated with development and production of resources such as oil and gas from the subterranean formation 10. Alternatively, the computer systems 34 can be located in a different location than the control center 32. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems. For example, computer systems 34 located at a different location than the remote control center can be used to implement the process described in relation to FIG. 5 that includes a methodology for enhancing pre-stack seismic data using data driven local summation with waveform corrections.

In some embodiments, results generated by the computer systems 34 may be displayed for user viewing using local or remote monitors or other display units. One approach to analyzing seismic data is to associate the data with portions of a seismic cube representing the subterranean formation 10. The seismic cube can also display results of the analysis of the seismic data associated with the seismic survey.

Figure 2:
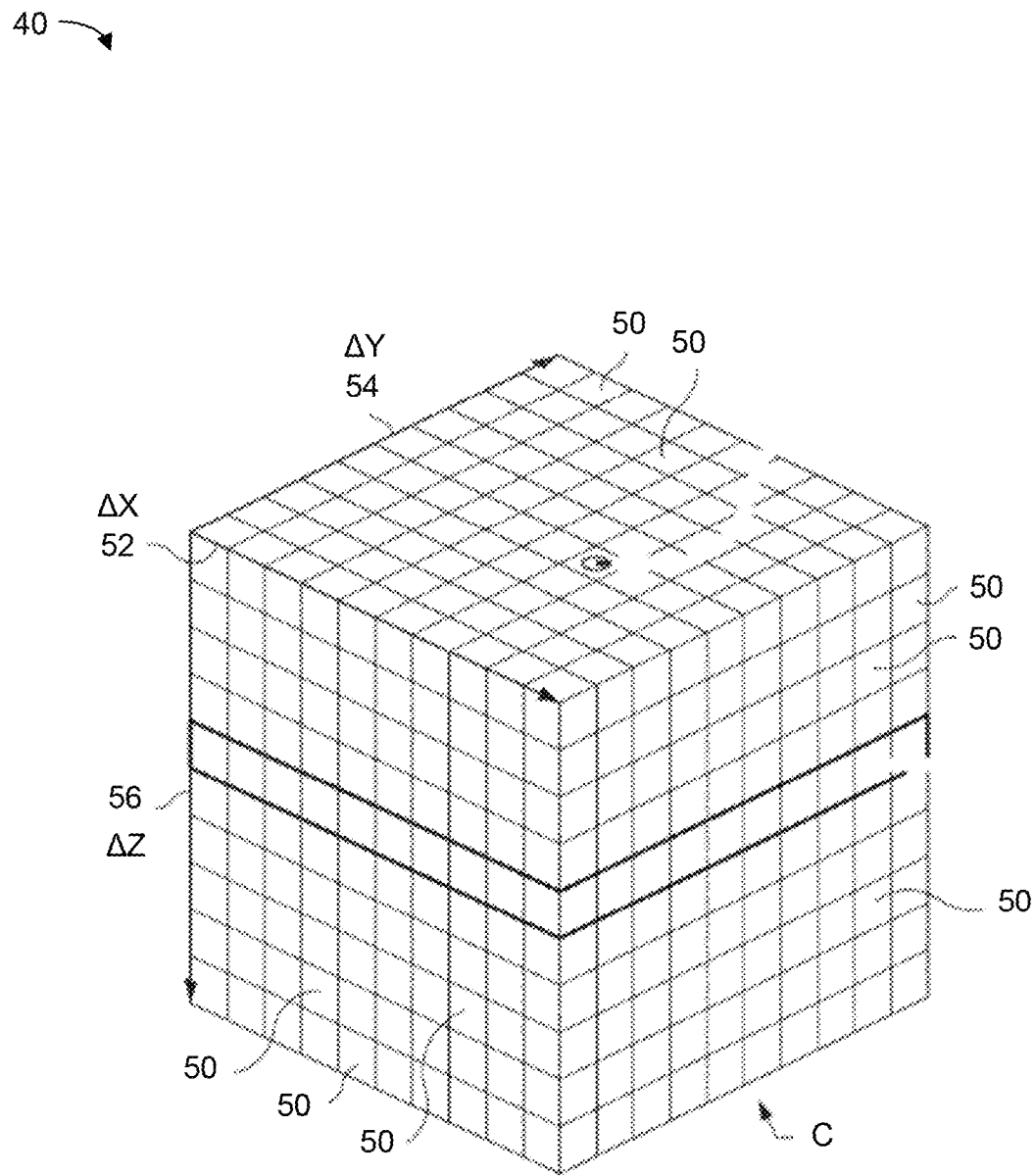
FIG. 2 illustrates a three-dimensional space for modeling subterranean features.

FIG. 2 illustrates a seismic cube 40 representing at least a portion of the subterranean formation 10. The seismic cube 40 is composed of a number of voxels 50. A voxel is a volume element and each voxel corresponds, for example, with a seismic sample along a seismic trace. The cubic volume C is composed along intersection axes of offset spacing times based on a Delta-X spacing 52, a Delta-Y offset spacing 54, and a Delta-Offset offset spacing 56. Within each voxel 50, statistical analysis can be performed on data assigned to that voxel to determine, for example, multimodal distributions of travel times and derive robust travel time estimates (according to mean, median, mode, standard deviation, kurtosis, and other suitable statistical accuracy analytical measures) related to azimuthal sectors allocated to the voxel 50.

Figure 3:
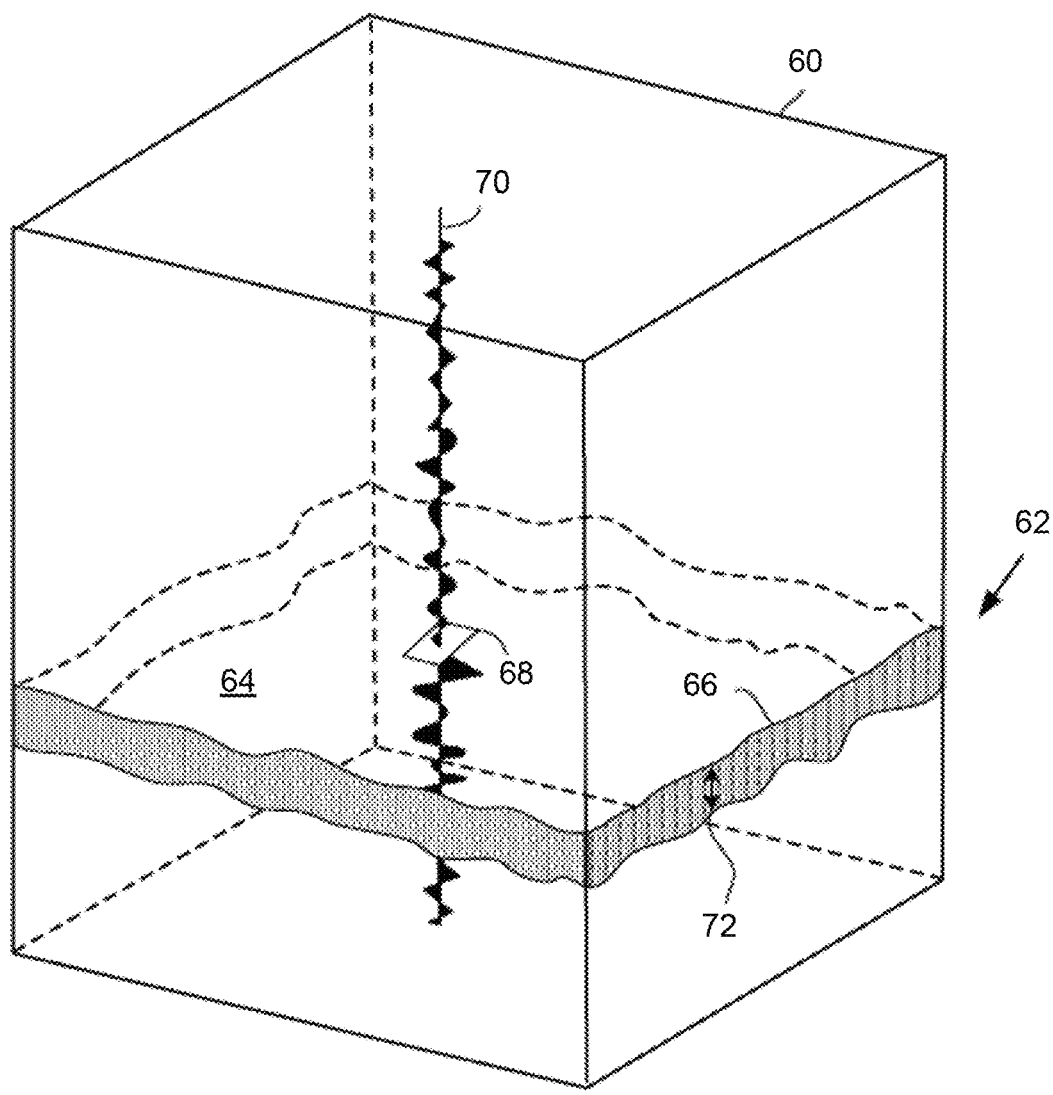
FIG. 3 illustrates a stratigraphic trace within a formation.

FIG. 3 illustrates a seismic cube 60 representing a formation. The seismic cube has a stratum 62 based on a surface (for example, amplitude surface 64) and a stratigraphic horizon 66. The amplitude surface 64 and the stratigraphic horizon 66 are grids that include many cells such as exemplary cell 68. Each cell is a seismic trace representing an acoustic wave. Each seismic trace has an x-coordinate and a y-coordinate, and each data point of the trace corresponds to a certain seismic travel time or depth (t or z). For the stratigraphic horizon 66, a time value is determined and then assigned to the cells from the stratum 62. For the amplitude surface 64, the amplitude value of the seismic trace at the time of the corresponding horizon is assigned to the cell. This assignment process is repeated for all of the cells on this horizon to generate the amplitude surface 64 for the stratum 62. In some instances, the amplitude values of the seismic trace 70 within window 72 by horizon 66 are combined to generate a compound amplitude value for stratum 62. In these instances, the compound amplitude value can be the arithmetic mean of the positive amplitudes within the duration of the window, multiplied by the number of seismic samples in the window.

Figure 4:
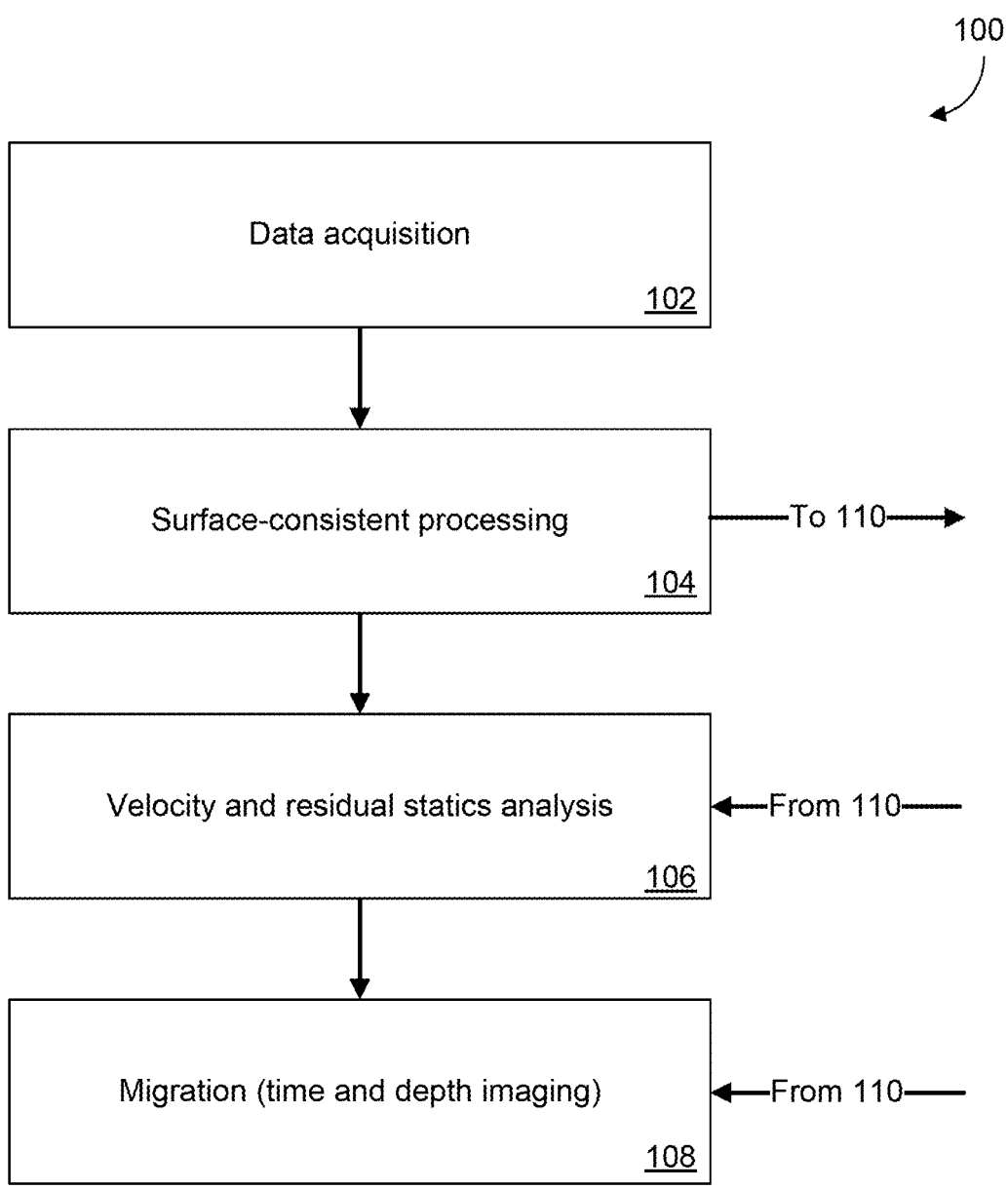
FIG. 4 shows an example process for enhancing pre-stack seismic data that compensates and preserves local travel-time shifts and waveform variations in the enhanced data.

Turning to FIG. 4, a process 100 including an integrated process of enhancing pre-stack seismic data that compensates and preservers local travel-time shifts and waveform variations in the enhanced data based on the seismic data received as described in relation to FIGS. 1-3 as well as other subsurface and production data sources. In some implementations, the actions of the process 100 are performed on computer systems 34, such as the computing system 300 described in FIG. 13.

Process 100 includes a flow diagram showing how velocity analysis and imaging fits into an overall process (for example, process 110 of FIG. 5) for enhancing pre-stack seismic data using data-driven local summation with waveform corrections. The process 100 describes the overall processing environment for the pre-stack data enhancement from data acquisition at the site to use of the processed data (for example, by computer systems 34). The process 100 includes data acquisition (102) (for example, such as described in relation to FIGS. 1-3). The computer systems 34 are configured to perform (104) surface-consistent processing. The data from the surface-consistent processing can include enhancing the pre-stack seismic data as described in relation to FIG. 5 and process 110. Once the pre-stack seismic data are enhanced, the computer systems 34 can perform (106) both velocity and residual statics analysis (described in relation to FIG. 5) and perform (108) migration analysis, including one or both of time and depth imaging. Migration analysis is also described in relation to FIG. 5.

Figure 5:
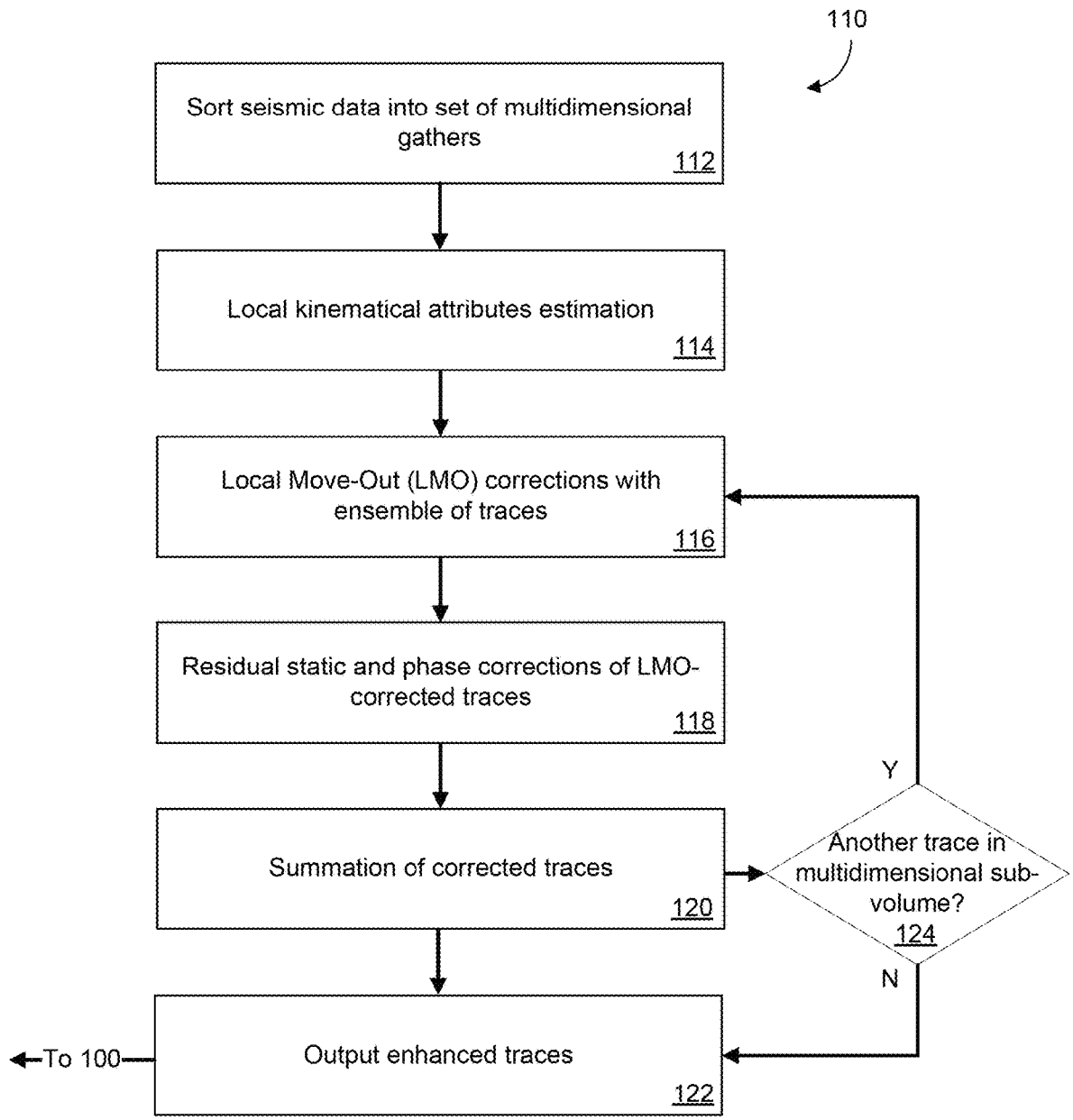
FIG. 5 shows an example process for enhancing pre-stack seismic data using data-driven local summation with waveform corrections.

Turning to FIG. 5, a process 110 for enhancing pre-stack seismic data using data-driven local summation with waveform corrections is presented. In some implementations, the actions of the process 110 are performed on computer systems 34, such as the computing system 300 described in FIG. 13.

The process 110 includes sorting (112), by the computer systems 34, seismic data into a set of appropriate multidimensional gathers. Generally, for 3D land orthogonal acquisition geometry, an appropriate domain to perform the enhancement can include a cross-spread domain. However, the process 110 can be applied to other domains including common-shot, common-offset, and common-receiver domains. Furthermore, the computer systems 34 can include more general multidimensional 3D or four dimensional (4D) subdomains of the whole pre-stack data cube. For performing the sort, the computing systems 34 receives, for consideration, data representing the particular criteria while choosing an appropriate domain for data enhancement. The particular criteria can include azimuth preservation, a number of seismic traces in each gather, density and regularity of a seismic trace distribution, a behavior of reflection travel-times in each domain, and an accessibility of the gathers. While certain criteria are highlighted for illustrative purposes, the computer systems 34 can also take other criteria into account for performing the sort.

Once the computing system has sorted the seismic data into the gathers, the computing system estimates (114) local kinematical attributes (LKA) for each multidimensional gather, which is generally the first step of multi-dimensional stacking. The LKA define local travel-time surfaces of reflected arrivals of signals transmitted by an emitter as previously described in relation to FIGS. 1-3.

The local kinematical attributes (also called kinematic parameters) locally describe travel-times of seismic emissions, which are respectively represented as seismic traces in the data. To perform LKA estimation, the computer systems 34 estimate these parameters at each seismic trace of the data volume (for example, in each position of reference trace). However, considering the relatively large amount of data that is processed, doing so is computationally expensive (and can be prohibitively so). To overcome this challenge, the process 110 includes an operator-oriented approach. The kinematic parameters are estimated on a coarsely sampled regular grid and interpolated into the entire volume. Each point in the coarse estimation grid is associated with parametric trace (for example, described in relation to FIGS. 6-7). In an example, each parametric trace consists of five kinematical parameters in each time sample. In other words, for this example, the size of each parametric trace is $5*N_t$ where $N_t$ is a number of time samples in each seismic trace in original seismic dataset.

Generally, the LKA are defined mathematically via a second-order Taylor expansion of reflected travel-time surfaces in the vicinity of a reference point in the data space. The position of each seismic trace within the whole 3D seismic data volume is characterized by four coordinates (two coordinates for the source and two coordinates for the receiver). Generally, a local second-order approximation of a wave front in a 4D acquisition space based on a Taylor expansion is expressed by 14 parameters. The parameters include first and second derivatives corresponding to dips and curvatures of the wave front in each direction in addition to mixed derivatives of different coordinate axes. Generally, because it is computationally expensive to estimate so many coefficients taking into account the volume of data to be processed, a simplification can be introduced to reduce processing time. One practical simplification is to implement data enhancement within a 2D subsection of the 4D data volume. In this example, only five local kinematical parameters need to be estimated, including two dips and two curvatures in each coordinate axis and one mixed derivative.

In an aspect, the computer systems 34 perform parameter estimation by automatic search for optimal values in a multi-dimensional coherency (semblance) panel. The input data for semblance analysis by the computer systems 34 can include an ensemble of actual seismic traces gathered in some vicinity of the reference point corresponding to the location for which LKA estimation is performed. The attributes are estimated at the positions of parametric traces, described in relation to FIGS. 6-7. The parametric traces do not necessarily coincide with actual seismic traces and can be placed much more sparsely (for example, with respect to actual seismic traces) to improve computing efficiency of the process.

Figure 6:
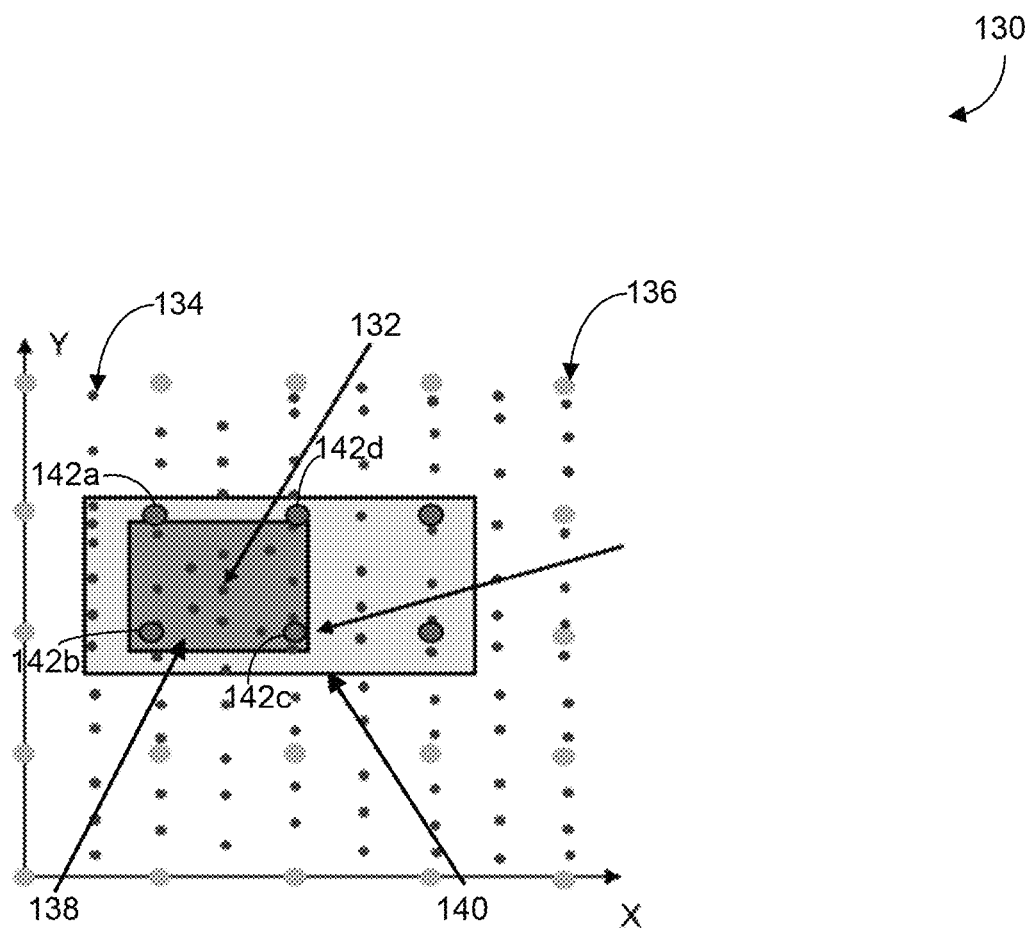
FIG. 6 is a graph showing an example of a parametric trace generation.

Turning to FIG. 6, a graph 130 shows an example of a parametric trace generation. The graph 130 includes an x-axis and a y-axis (for example, two dimensional) for purposes of illustration, but additional dimensions can be included. A reference trace 132 corresponding to a seismic signal is shown. The reference trace 132 is a particular trace of a plurality of seismic traces, including an example seismic trace 134. The plurality of seismic traces are not regular, and estimating the local kinematical attributes for each of these seismic traces can be computationally expensive. The grid of parametric traces, including parametric trace 136, is shown superimposed on the seismic traces 134. The parametric traces represent a coarsely sampled regular grid and are interpolated into the entire volume. This is performed using an operator aperture 140 and a summation aperture 138. Local summation is performed (for example, by computer systems 34) in the summation aperture which includes the nearest parametric traces 142 a, 142 b, 142 c, and 142 d. To perform the local summation, the parametric traces where local moveout surfaces are defined (for example, within the operator window) are used.

Returning to FIG. 5, the computer systems 34 perform local move-out (LMO) corrections (116) with an ensemble of seismic traces. For each actual seismic trace to be enhanced (for example, reference trace 132 of FIG. 6), an ensemble of neighboring seismic traces is gathered. The number of seismic traces in this ensemble can be determined by the predefined by user stacking apertures (for example, operator aperture 140). The computer systems 34 define the stacking apertures by taking into account a tradeoff between signal-to-noise ratio (SNR) improvement and the risk of over-smoothing of output data after enhancement. Generally, aperture widths vary in the range of several hundred meters.

The computer systems 34 applies LMO corrections along the travel-time surfaces, which were estimated during the estimation of LKA. The LMO corrections are applied to all seismic traces in the ensemble. The computer systems 34 construct LMO surfaces from each parametric trace (for example, traces 136 of FIG. 6). As a result, the LMO-corrected ensemble of seismic traces is obtained by the computing system and can be used as an input ensemble for residual statics and phase correction procedure.

Figure 7:
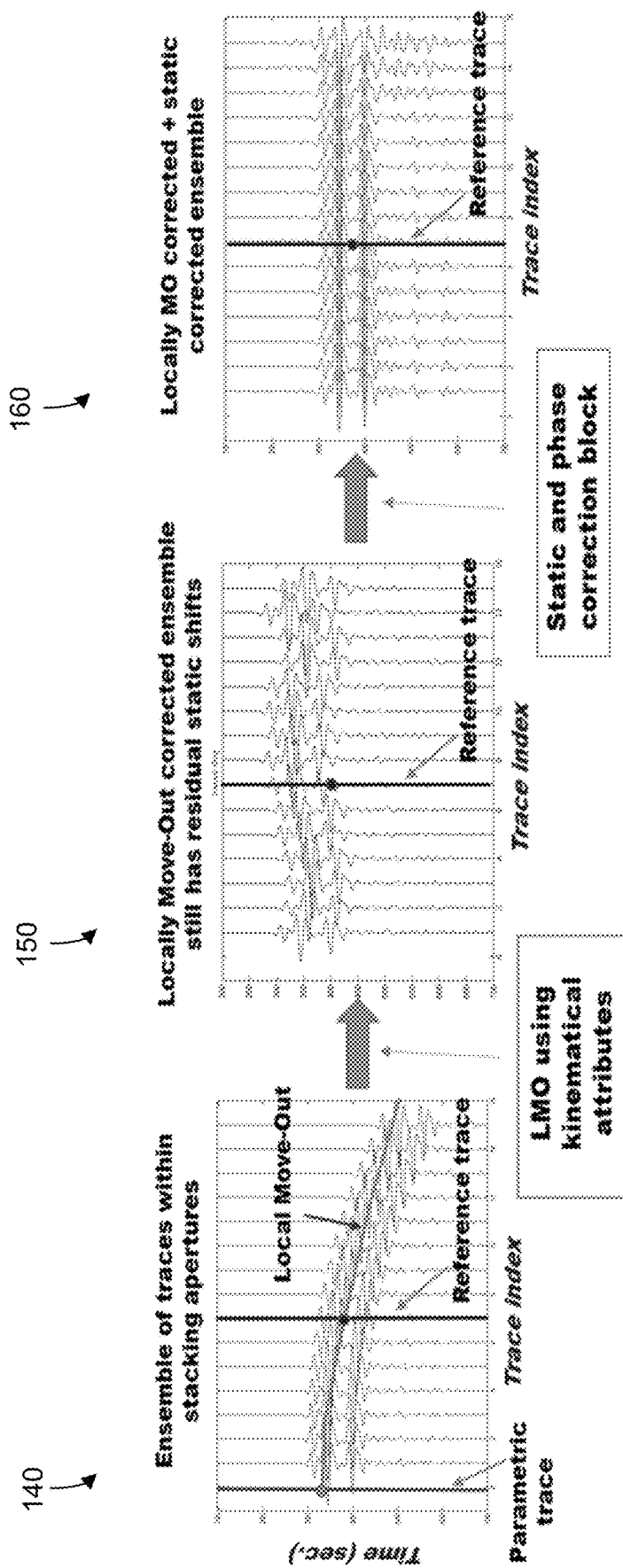
FIG. 7 shows examples of parametric traces used computation of Local Move-Out (LMO) surfaces.

Turning to FIG. 7, examples of the parametric traces used for computation of LMO surfaces are shown in graphs 140, 150, and 160. These graphs 140, 150, and 160 show an explanation of the proposed process 110 for single parametric trace. At graph 140, a LMO surface is constructed from the parametric trace using estimated kinematical attributes with respect to reference trace. The computer systems 34 perform LMO corrections using the LKA that were estimated at step 114. The result is shown in graph 150, in which an LMO-corrected ensemble of traces with residual static and phase shifts are shown. Once the computer systems 34 perform static and phase correction, the ensemble of traces is corrected. Graph 160 shows a corrected ensemble of seismic traces before summation is performed.

Figure 8:
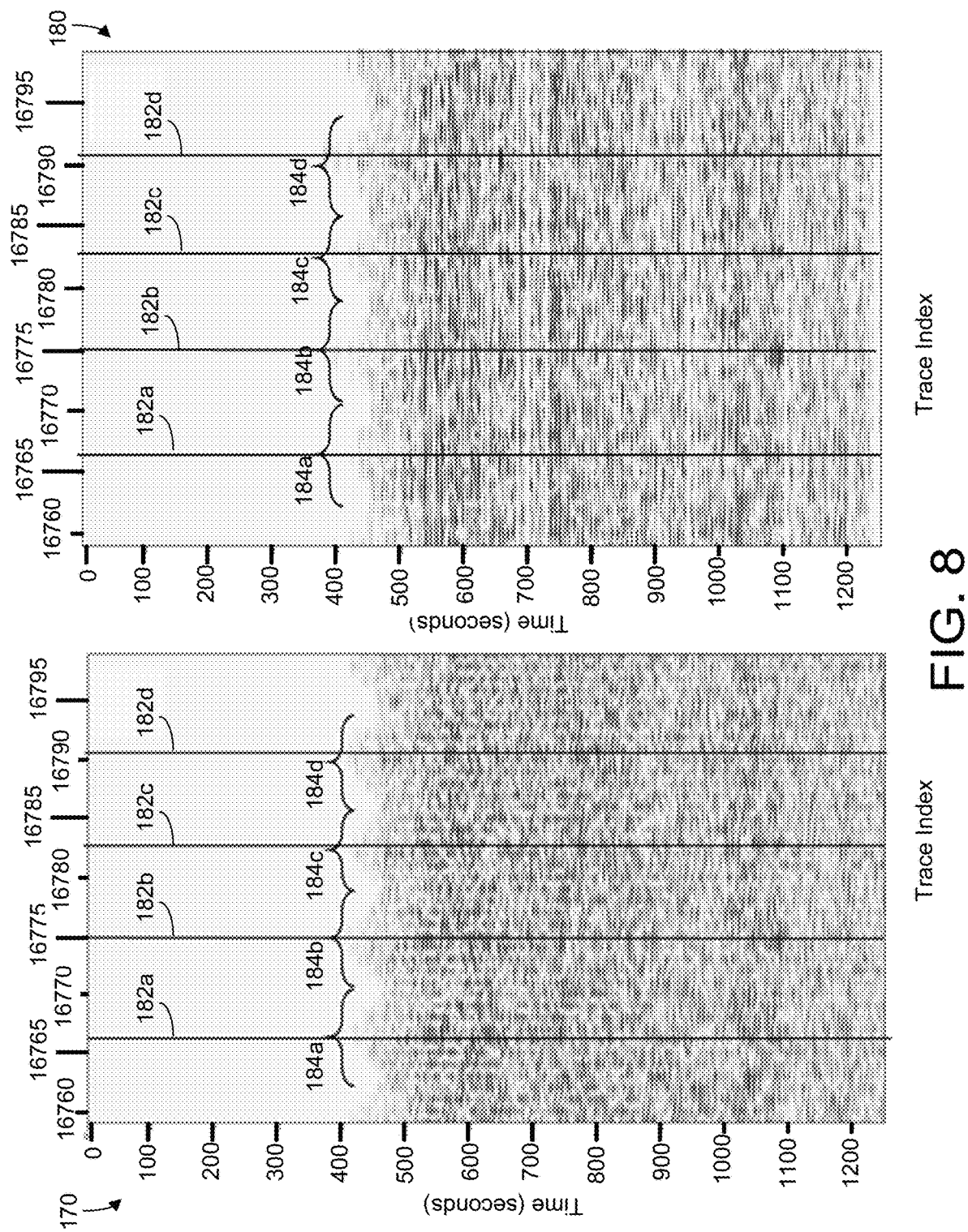
FIG. 8 includes graphs showing a comparison between an uncorrected and a corrected ensemble of seismic traces

Turning to FIG. 8, a comparison between an uncorrected and a corrected ensemble of seismic traces is shown in graphs 170 and 180. Graph 170 shows a number of traces ensembles before local moveout corrections. Graph 180 shows a number of traces ensembles after local moveout corrections. Reference traces 182a, 182b, 182c, and 182d are marked by vertical lines in each of graph 170 and graph 180. Corresponding ensembles 184a, 184b, 184c, and 184d of neighboring traces are shown with brackets. Ensembles in graph 180 are input for a residual static and phase corrections module, described in relation of FIG. 5. Stacking all traces within the ensembles marked by brackets produces single output trace.

Returning to FIG. 5, once the LMO corrections are performed, the computer systems 34 performs residual static and phase corrections (118) of the LMO-corrected traces. The computer systems 34 apply the residual statics and phase correction procedure for each LMO corrected ensemble to account for time shifts and phase variations of traces within the ensemble. The computer systems 34 perform the corrections with respect to a reference trace (or a pilot trace constructed on the base of a reference trace). Such procedure can be done using an approach presented by Neklyudov D., Bakulin A., Dmitriev M., Silvestrov I., 2017, Intra-array statics and phase corrections obtained by beamforming in the short-time Fourier transform domain: Application to supergrouping, SEG Annual Meeting, or by other means. For example, time-shift only corrections can be obtained similar to works of Taner M. T., Koehler F., 1998, Estimation of unbiased delays, Geophysics, 63(2), 738-742; or Mao W., Gubbins D., Simultaneous determination of time delays and stacking weights in seismic array beamforming, Geophysics, 1995, 60(2), p. 491-502. After this stage, all traces in the ensemble should be aligned with respect to desired arrivals in the reference trace.

The computer systems 34 perform summation (120) of the corrected traces to obtain an output trace. The corresponding time samples of the seismic traces (shown in FIG. 8) in the ensemble are summed to produce the output trace. Output traces from each auxiliary ensemble corresponding to a different parametric trace are summed after residual static and phase corrections to produce the final output trace with an increased signal-to noise ratio. Residual statics, waveforms and high frequencies in the enhanced trace are better preserved due to optimized summation of corrected input traces. The output trace can be set (122) to another system or otherwise presented to a user by a user interface of the computing systems 34. The residual statics, wave forms, and high frequencies of the original reference trace are preserved, extracted, and presented in the summation process. In some implementations, if the computing system determines (124) that additional traces are present in the multidimensional sub-volume, then the computing system iterates through steps 116, 118, and 120 for each remaining trace.

Figure 9:
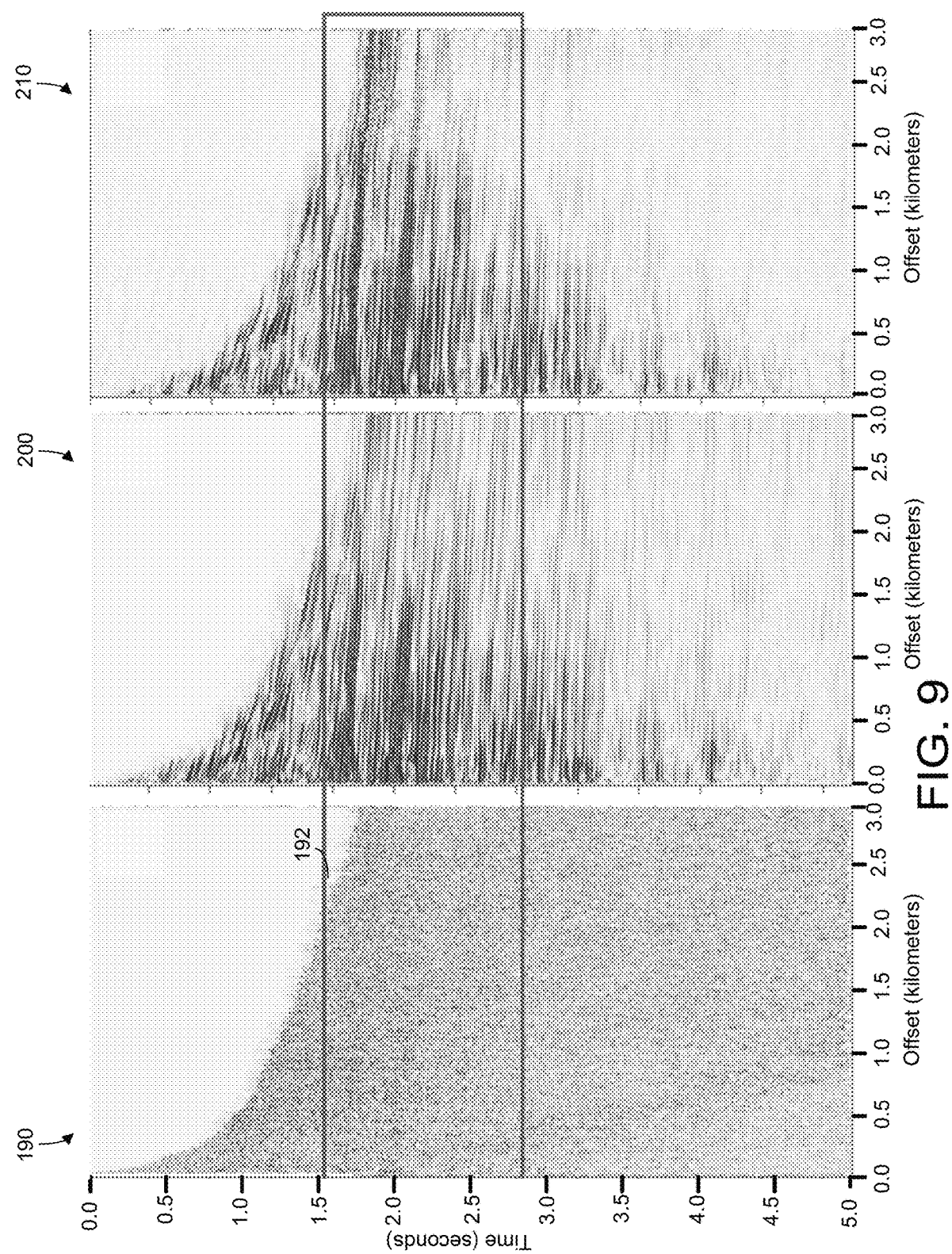
FIG. 9 shows a real-data example of enhancing pre-stack seismic data using data-driven local summation with waveform corrections.

Turning to FIG. 9, a real-data example is shown in graphs 190, 200, and 210. For this example, a non-linear beamforming (NLBF) method for data-driven enhancement and the approach proposed in Neklyudov et al. (2017) for residual statics and phase corrections is used by the computer systems 34. Graphs 190, 200, and 210 show an example of common-midpoint (CMP) gather from a challenging 3D land dataset. The input seismic data have been already passed through a standard processing flow and are ready for velocity analysis and imaging. Graph 190 shows the original data of a CMP gather. Graph 200 shows the seismic data after NLBF is performed, and without internal statics and phase corrections. Graph 210 shows the seismic data after NLBF is performed and after additional phase corrections are performed by the computer systems 34.

Figure 10:
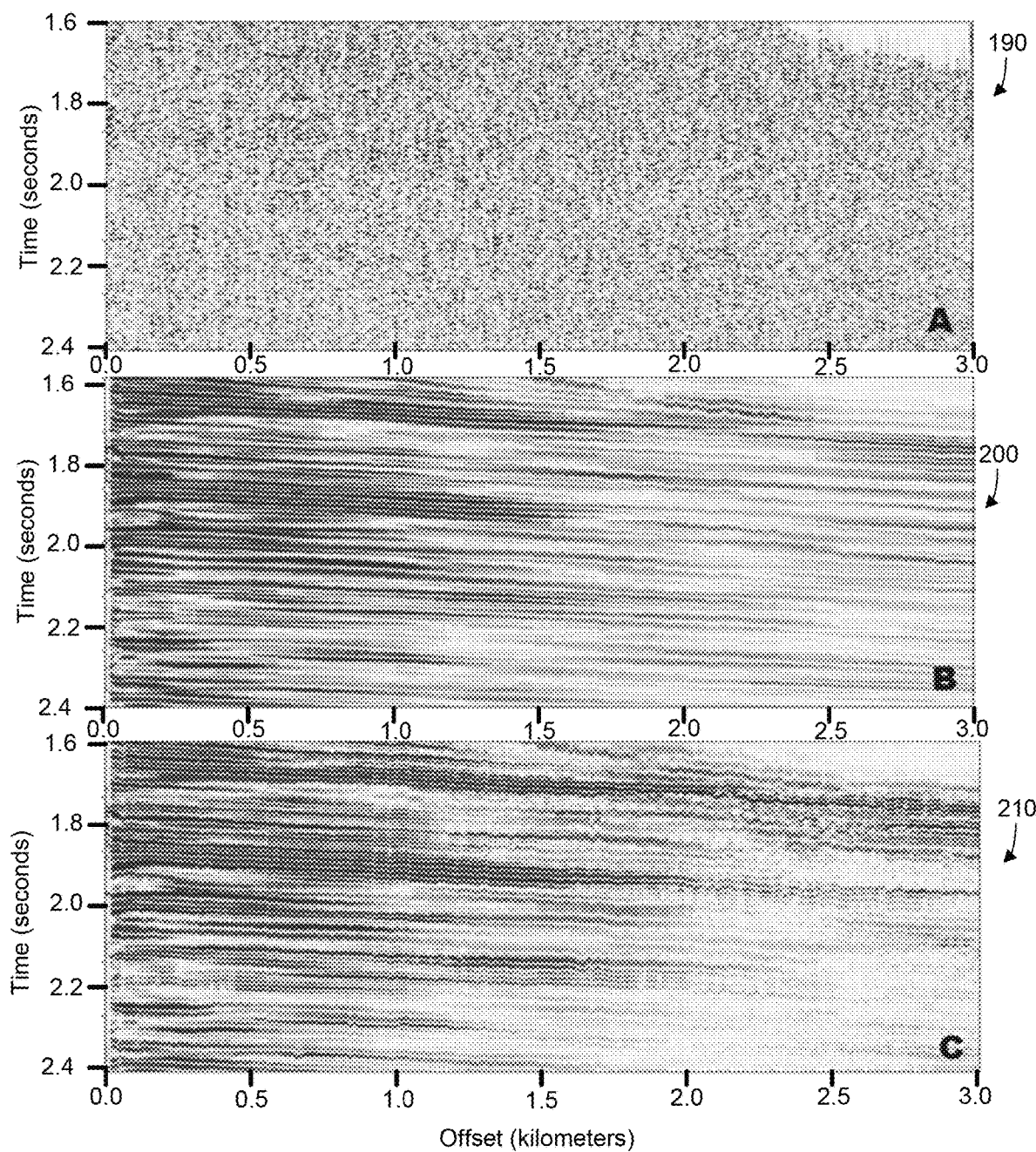
FIG. 10 shows a zoomed-in view of the seismic data of FIG. 9.

As shown in graph 190, a pre-stack signal is such that there are no visible reflections in the gather. Graph 210 shows the same CMP gather after NLBF data enhancement with summation apertures 250 m×250 m in CMP and offset directions. Approximately 400 neighboring traces were used in the local summation to enhance each original trace in this example. After the enhancement, the reflections are easily recognizable at the whole offset range, shown within region 192. However, high-frequency content of the signal is suppressed due to sub-optimal stacking. Retaining the high frequency content in seismic data is important because it allows the computer systems 34 to construct more resolved seismic images (for example, either in time or depth) and to detect finer structures in the subsurface than detectable with lower frequency content in the seismic data. FIG. 10 provides such an example.

FIG. 10 shows a zoomed-in view of the seismic data of FIG. 9 of region 192. The time window of each graph 190, 200, and 210 FIG. 10 is 1.6-2.4 seconds. As shown in graph 200, the reflections are strong compared to the data of graph 190, but the reflections become over-smoothed during NLBF data enhancement. In contrast, things are changed when the computer systems 34 apply NLBF data enhancement procedure with intermediate residual statics and phase corrections in graph 210. In this case, reflections are still visible in the entire offset range but are resolved with more details. Sharp time shifts between neighboring traces are clearly distinguishable. This shows that the original input data still contain some residual statics in the gather which was unresolved due to low signal-to-noise ratio. This remaining residual statics can be successfully estimated now by applying the standard algorithms to the enhanced dataset, such as proposed by Ronen, J. and Claerbout, J. F., 1985, Surface-consistent residual statics estimation by stack-power maximization: Geophysics, 50, 2759-2767.

Figure 11:
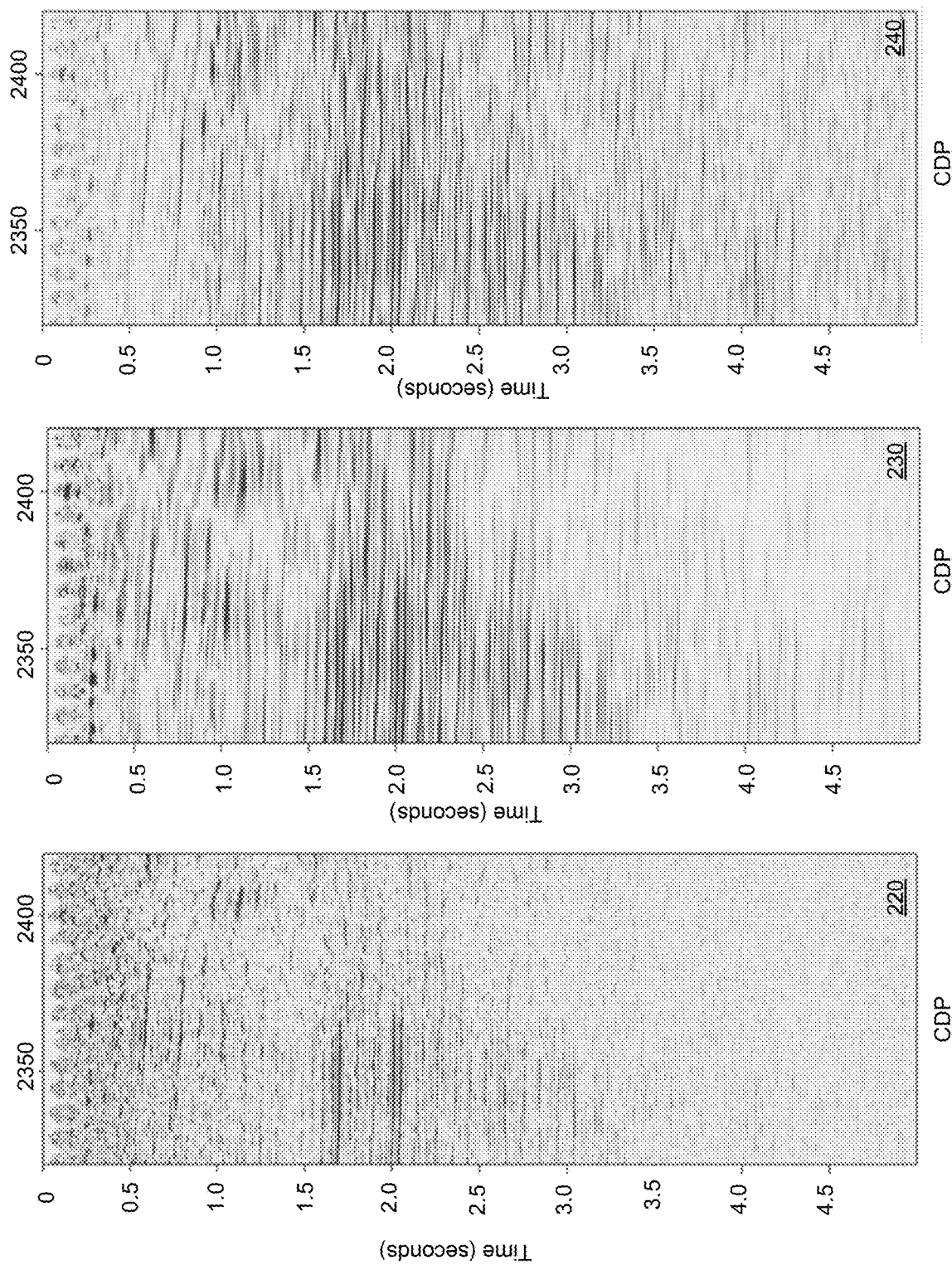
FIG. 11 shows a fragment of zero-offset stack section with original and enhanced seismic data.

Turning to FIG. 11, a fragment of zero-offset stack section with original and enhanced seismic data are shown. Graph 220 shows stack section obtained with original seismic data. Graph 230 shows a stack with enhanced data, where no additional corrections are performed during data enhancement. Graph 240 shows a stack with enhanced data, where additional phase correction during NLBF data enhancement is performed by the method proposed in Neklyudov et al., 2017. As one can see in graph 240, the stack section obtained using data which has been processed by the suggested approach shows better resolution than stack constructed using enhanced data with no additional phase corrections (graph 230).

Figure 12:
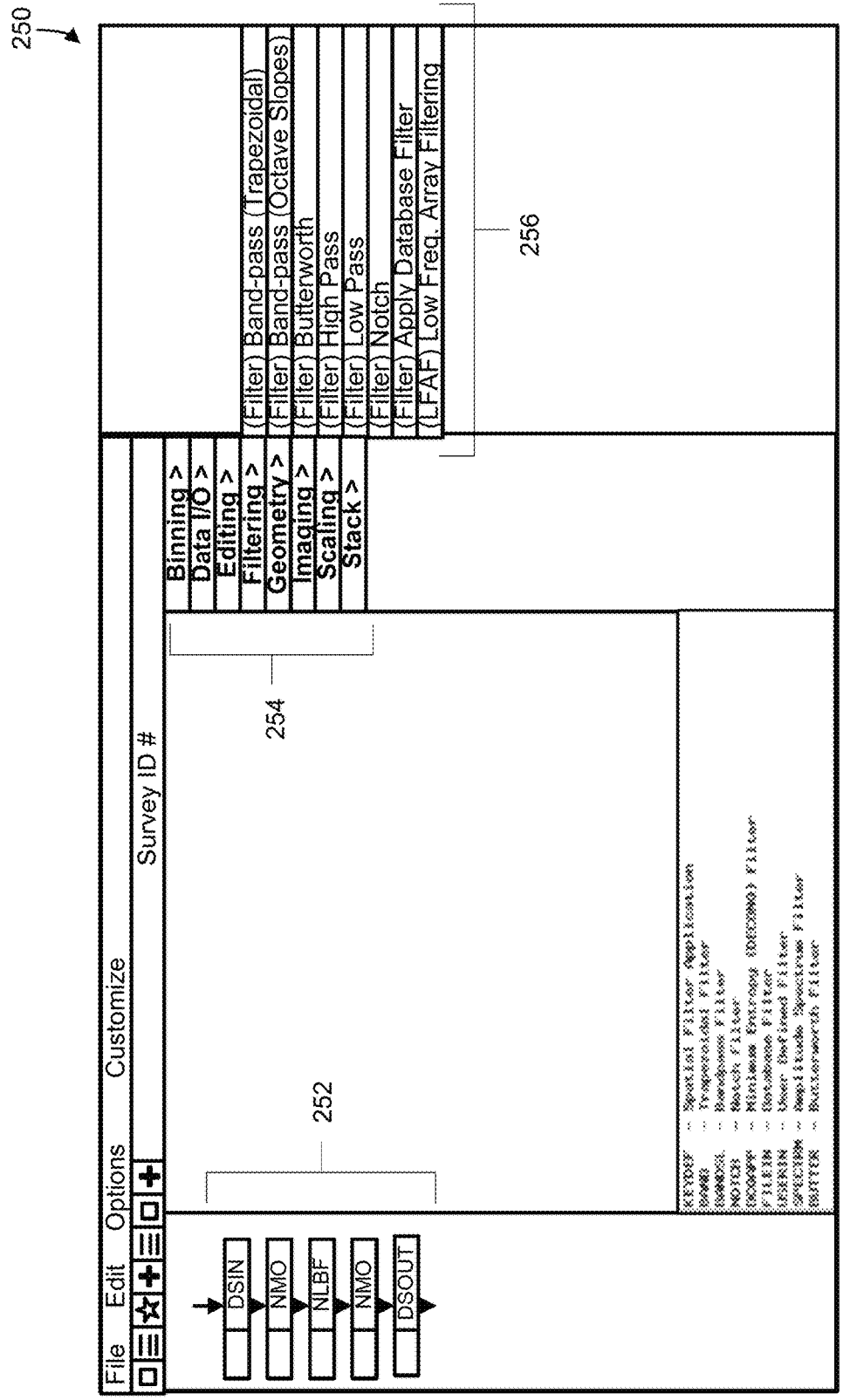
FIG. 12 shows a screenshot of a production processing platform.

FIG. 12 shows a representation 250 of a user interface including a production processing platform illustrating its seismic processing modules 252, 254. The relations between modules are decided by the processing geophysicist, depending on the type of seismic data to process. The modules of the production processing platform are used to execute the steps of the process 110 described in relation to FIG. 5. For example, filtering modules 256 are shown. The interface enables a user to configure the modules to operate on the seismic data as needed, such as in the order required for producing the results described previously. For example, modules 252 show an order of data processing by the system.

Figure 13:
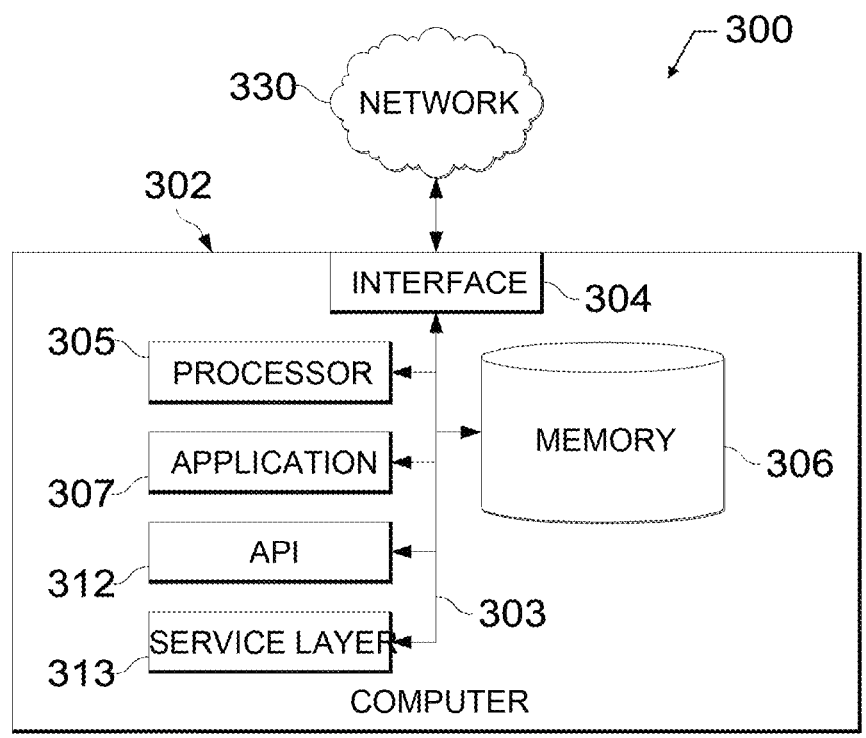
FIG. 13 shows a block diagram of an exemplary computer system used to provide computational functionalities associated with described algorithms, methods, functions, processes, flows, and procedures as described in the instant disclosure, according to an implementation.

FIG. 13 depicts a block diagram of an exemplary computer system 300 used to provide computational functionalities associated with described algorithms, methods, functions, processes, flows, and procedures as described in the instant disclosure, according to an implementation. The illustrated computer 302 is intended to encompass any computing device such as a server, desktop computer, laptop or notebook computer, wireless data port, smart phone, personal data assistant (PDA), tablet computing device, or one or more processors within these devices, including both physical or virtual instances (or both) of the computing device. Additionally, the computer 302 may comprise a computer that includes an input device, such as a keypad, keyboard, touch screen, or other device that can accept user information, and an output device that conveys information associated with the operation of the computer 302, including digital data, visual, or audio information (or a combination of information), or a GUI.

The computer 302 can serve in a role as a client, network component, a server, a database or other persistency, or any other component (or a combination of roles) of a computer system for performing the subject matter described in the instant disclosure. The illustrated computer 302 is communicably coupled with a network 330. In some implementations, one or more components of the computer 302 may be configured to operate within environments, including cloud-computing-based, local, global, or a combination of environments.

At a high level, the computer 302 is an electronic computing device operable to receive, transmit, process, store, or manage data and information associated with the described subject matter. According to some implementations, the computer 302 may also include or be communicably coupled with an application server, e-mail server, web server, caching server, streaming data server, business intelligence (BI) server, or other server (or a combination of servers).

The computer 302 can receive requests over network 330 from a client application (for example, executing on another computer 302) and responding to the received requests by processing the said requests in a software application. In addition, requests may also be sent to the computer 302 from internal users (for example, from a command console or by other access method), external or third parties, other automated applications, as well as any other entities, individuals, systems, or computers.

Each of the components of the computer 302 can communicate using a system bus 303. In some implementations, any or all of the components of the computer 302, both hardware or software (or a combination of hardware and software), may interface with each other or the interface 304 (or a combination of both) over the system bus 303 using an application programming interface (API) 312 or a service layer 313 (or a combination of the API 312 and service layer 313). The API 312 may include specifications for routines, data structures, and object classes. The API 312 may be either computer-language independent or dependent and refer to a complete interface, a single function, or even a set of APIs. The service layer 313 provides software services to the computer 302 or other components (whether or not illustrated) that are communicably coupled to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in extensible markup language (XML) format or other suitable format. While illustrated as an integrated component of the computer 302, alternative implementations may illustrate the API 312 or the service layer 313 as stand-alone components in relation to other components of the computer 302 or other components (whether or not illustrated) that are communicably coupled to the computer 302. Moreover, any or all parts of the API 312 or the service layer 313 may be implemented as child or sub-modules of another software module, enterprise application, or hardware module without departing from the scope of this disclosure.

The computer 302 includes an interface 304. Although illustrated as a single interface 304, two or more interfaces 304 may be used according to particular needs, desires, or particular implementations of the computer 302. The interface 304 is used by the computer 302 for communicating with other systems in a distributed environment that are connected to the network 330 (whether illustrated or not). Generally, the interface 304 comprises logic encoded in software or hardware (or a combination of software and hardware) and operable to communicate with the network 330. More specifically, the interface 304 may comprise software supporting one or more communication protocols associated with communications such that the network 330 or interface's hardware is operable to communicate physical signals within and outside of the illustrated computer 302.

The computer 302 includes a processor 305. Although illustrated as a single processor 305, two or more processors may be used according to particular needs, desires, or particular implementations of the computer 302. Generally, the processor 305 executes instructions and manipulates data to perform the operations of the computer 302 and any algorithms, methods, functions, processes, flows, and procedures as described in the instant disclosure.

The computer 302 also includes a memory 306 that holds data for the computer 302 or other components (or a combination of both) that can be connected to the network 330 (whether illustrated or not). For example, memory 306 can be a database storing data consistent with this disclosure. Although illustrated as a single memory 306, two or more memories may be used according to particular needs, desires, or particular implementations of the computer 302 and the described functionality. While memory 306 is illustrated as an integral component of the computer 302, in alternative implementations, memory 306 can be external to the computer 302.

The application 307 is an algorithmic software engine providing functionality according to particular needs, desires, or particular implementations of the computer 302, particularly with respect to functionality described in this disclosure. For example, application 307 can serve as one or more components, modules, or applications. Further, although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, a computer system containing computer 302, each computer 302 communicating over network 330. Further, the term "client," "user," and other terminology may be used interchangeably as without departing from the scope of this disclosure. Moreover, this disclosure contemplates that many users may use one computer 302, or that one user may use multiple computers 302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data. Such devices can include, for example, a programmable processor, a computer, or multiple processors or computers. The apparatus can also be or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, or libraries. Conversely, the features and functionality of various components can be combined into single components.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and compact disc read-only memory (CD-ROM), Digital Versatile Disc (DVD)+/−R, DVD-RAM, and DVD-ROM disks. The memory may store various objects or data, including caches, classes, frameworks, applications, backup data, jobs, web pages, web page templates, database tables, repositories storing dynamic information, and any other information including any parameters, variables, algorithms, instructions, rules, constraints, or references thereto. Additionally, the memory may include any other data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), Light Emitting Diode (LED), or plasma monitor, for displaying information to the user and a keyboard and a pointing device, for example, a mouse, trackball, or trackpad, by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term graphical user interface (GUI) may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 502.11a/b/g/n or 502.20 (or a combination of 502.11x and 502.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an API or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of the described system or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described earlier as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed.

Moreover, the separation or integration of various system modules and components in the implementations described earlier should not be understood as requiring such separation or integration in all implementations, and it should be understood that the described program components and systems can generally be integrated together in a single software product or packaged into multiple software products.

Accordingly, the earlier description of example implementations does not define or constrain this disclosure. Other changes, substitutions, and alterations are also possible without departing from the spirit and scope of this disclosure.

Furthermore, any claimed implementation described later is considered to be applicable to at least a computer-implemented method, a non-transitory, computer-readable medium storing computer-readable instructions to perform the computer-implemented method, and a computer system comprising a computer memory interoperably coupled with a hardware processor configured to perform the computer-implemented method or the instructions stored on the non-transitory, computer-readable medium.

What is claimed is:

1. A method for providing seismic images of a subsurface by enhancing pre-stack seismic data, the method comprising:
   measuring reflections of seismic waves emitted into a geological formation;
   generating, from the reflections of the seismic waves, seismic data comprising a plurality of seismic traces;
   sorting the seismic data into at least one multidimensional gather comprising a data domain;
   determining local kinematical attributes of a seismic trace of the plurality of seismic traces, the local kinematical attributes representing travel-times local to the seismic trace;
   forming an ensemble of seismic traces, wherein the seismic trace represents a reference point for the ensemble;
   applying local moveout corrections to each seismic trace of the ensemble;

applying residual statics and phase corrections for each seismic trace that is corrected by the local moveout corrections;

summing the seismic traces of the ensemble to obtain an output seismic trace having an increased signal-to-noise ratio (SNR) relative to the seismic trace of the plurality of seismic traces that represents the reference point for the ensemble of seismic traces;

generating a seismic image from the output seismic trace, the seismic image having an increased resolution relative to another seismic image generated without the output seismic trace; and based on the seismic image, controlling a field operation to extract hydrocarbons.

2. The method of claim 1, wherein the seismic trace that represents the reference point for the ensemble of seismic traces comprises a parametric trace comprising a plurality of kinematical parameters for each time sample of the plurality of seismic traces.

3. The method of claim 1, wherein the data domain comprises one of a cross-spread domain, a common-shot domain, a common-offset domain, or a common receiver domain.

4. The method of claim 1, wherein summing the seismic traces of the ensemble comprises a summation aperture of 250 meters (m)×250 m in a common-midpoint gather direction and an offset direction.

5. The method of claim 1, wherein sorting the seismic data into the at least one multidimensional gather comprising the data domain comprises selecting the data domain based on at least one of an azimuth preservation, a number of seismic traces in the plurality of seismic traces, a density of a distribution of the plurality of seismic traces, a regularity of the distribution of the plurality of seismic traces, and a reflection travel-time of the plurality of seismic traces in the data domain.

6. The method of claim 1, wherein determining the local kinematical attributes of the seismic trace comprises searching for optimal values of the local kinematical attributes in a multi-dimensional coherency panel.

7. The method of claim 1, further comprising performing a time imaging or a depth imaging representation of the geological formation based on the output seismic trace; and
providing a graphical representation of the time imaging or the depth imaging representation of the geological formation by a user interface.

8. A system configured to provide seismic images of a subsurface by enhancing pre-stack seismic data executed by one or more processors, the system comprising:
a sensor configured to measure reflections of seismic waves emitted into a geological formation and generate seismic data comprising a plurality of seismic traces;
a computer memory; and
at least one computer processor interoperably coupled with the computer memory and configured to perform operations comprising:
receiving the seismic data from the sensor;
sorting the seismic data into at least one multidimensional gather comprising a data domain;
determining local kinematical attributes of a seismic trace of the plurality of seismic traces, the local kinematical attributes representing travel-times local to the seismic trace;
forming an ensemble of seismic traces, wherein the seismic trace represents a reference point for the ensemble;

applying local moveout corrections to each seismic trace of the ensemble;

applying residual statics and phase corrections for each seismic trace that is corrected by the local moveout corrections;

summing the seismic traces of the ensemble to obtain an output seismic trace having an increased signal-to-noise ratio (SNR) relative to the seismic trace of the plurality of seismic traces that represents the reference point for the ensemble of seismic traces;

generating a seismic image from the output seismic trace, the seismic image having an increased resolution relative to another seismic image generated without the output seismic trace; and based on the seismic image, controlling a field operation to extract hydrocarbons.

9. The system of claim 8, wherein the seismic trace that represents the reference point for the ensemble of seismic traces comprises a parametric trace comprising a plurality of kinematical parameters for each time sample of the plurality of seismic traces.

10. The system of claim 8, wherein the data domain comprises one of a cross-spread domain, a common-shot domain, a common-offset domain, or a common receiver domain.

11. The system of claim 8, wherein summing the seismic traces of the ensemble comprises a summation aperture of 250 meters (m)×250 m in a common-midpoint gather direction and an offset direction.

12. The system of claim 8, wherein sorting the seismic data into the at least one multidimensional gather comprising the data domain comprises selecting the data domain based on at least one of an azimuth preservation, a number of seismic traces in the plurality of seismic traces, a density of a distribution of the plurality of seismic traces, a regularity of the distribution of the plurality of seismic traces, and a reflection travel-time of the plurality of seismic traces in the data domain.

13. The system of claim 8, wherein determining the local kinematical attributes of the seismic trace comprises searching for optimal values of the local kinematical attributes in a multi-dimensional coherency panel.

14. The system of claim 8, further comprising performing a time imaging or a depth imaging representation of the geological formation based on the output seismic trace; and
providing a graphical representation of the time imaging or the depth imaging representation of the geological formation by a user interface.

15. A non-transitory, computer-readable medium storing one or more instructions executable by a computer system to perform operations comprising:
receiving seismic data comprising a plurality of seismic traces, the seismic data being generated by measuring reflections of seismic waves emitted into a geological formation;
sorting the seismic data into at least one multidimensional gather comprising a data domain;
determining local kinematical attributes of a seismic trace of the plurality of seismic traces, the local kinematical attributes representing travel-times local to the seismic trace;
forming an ensemble of seismic traces, wherein the seismic trace represents a reference point for the ensemble;
applying local moveout corrections to each seismic trace of the ensemble;

applying residual statics and phase corrections for each seismic trace that is corrected by the local moveout corrections;

summing the seismic traces of the ensemble to obtain an output seismic trace having an increased signal-to-noise ratio (SNR) relative to the seismic trace of the plurality of seismic traces that represents the reference point for the ensemble of seismic traces;

generating a seismic image from the output seismic trace, the seismic image having an increased resolution relative to another seismic image generated without the output seismic trace; and based on the seismic image, controlling a field operation to extract hydrocarbons.

16. The non-transitory, computer-readable medium of claim 15, wherein the seismic trace that represents the reference point for the ensemble of seismic traces comprises a parametric trace comprising a plurality of kinematical parameters for each time sample of the plurality of seismic traces.

17. The non-transitory, computer-readable medium of claim 15, wherein the data domain comprises one of a cross-spread domain, a common-shot domain, a common-offset domain, or a common receiver domain.

18. The non-transitory, computer-readable medium of claim 15, wherein summing the seismic traces of the ensemble comprises a summation aperture of 250 meters (m)×250 m in a common-midpoint gather direction and an offset direction.

19. The non-transitory, computer-readable medium of claim 15, wherein sorting the seismic data into the at least one multidimensional gather comprising the data domain comprises selecting the data domain based on at least one of an azimuth preservation, a number of seismic traces in the plurality of seismic traces, a density of a distribution of the plurality of seismic traces, a regularity of the distribution of the plurality of seismic traces, and a reflection travel-time of the plurality of seismic traces in the data domain.

20. The non-transitory, computer-readable medium of claim 15, wherein determining the local kinematical attributes of the seismic trace comprises searching for optimal values of the local kinematical attributes in a multi-dimensional coherency panel.

* * * * *